(12) United States Patent
Zhu et al.

(10) Patent No.: US 11,327,498 B2
(45) Date of Patent: May 10, 2022

(54) POLYNOMIAL-FIT BASED REFERENCE LINE SMOOTHING METHOD FOR HIGH SPEED PLANNING OF AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Lin Ma, Beijing (CN); Xin Xu, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 621 days.

(21) Appl. No.: 16/314,332

(22) PCT Filed: Dec. 26, 2018

(86) PCT No.: PCT/CN2018/123936
§ 371 (c)(1),
(2) Date: Dec. 28, 2018

(87) PCT Pub. No.: WO2020/132952
PCT Pub. Date: Jul. 2, 2020

(65) Prior Publication Data
US 2021/0181756 A1   Jun. 17, 2021

(51) Int. Cl.
*G05D 1/02* (2020.01)
*G01C 21/00* (2006.01)
(Continued)

(52) U.S. Cl.
CPC ....... *G05D 1/0223* (2013.01); *G01C 21/3446* (2013.01); *G01C 21/3867* (2020.08); *G05D 1/0221* (2013.01); *G06N 20/00* (2019.01)

(58) Field of Classification Search
CPC ............... G05D 1/0223; G05D 1/0221; G05D 2201/0213; G05D 1/0212; G05D 1/0088;
(Continued)

(56) References Cited

U.S. PATENT DOCUMENTS

| 6,134,486 A | 10/2000 | Kanayama |
| 2010/0106356 A1* | 4/2010 | Trepagnier ............... G08G 1/16 701/25 |

(Continued)

FOREIGN PATENT DOCUMENTS

| CN | 108958258 | 12/2018 |
| JP | 11086182 A | 3/1999 |

(Continued)

*Primary Examiner* — Kelly D Williams
(74) *Attorney, Agent, or Firm* — Womble Bond Dickinson (US) LLP

(57) ABSTRACT

According to various embodiments, systems and methods for smoothing a reference line for an autonomous driving vehicle are described. In an exemplary method, a raw reference line can be generated from a high definition map and routing results, and can be truncated based on a predetermined formula. The truncated raw reference line can include a number of points, each point representing a position of an autonomous driving vehicle in a global coordinate system. The number of points can be converted to points in a local coordinate system, where a polynomial curve that best fits the points are generated. The polynomial curve can subsequently be used to generate a new vertical coordinate for a horizontal coordinate of each of the number of points. The new vertical coordinates and their corresponding horizontal coordinates can be converted back to the global coordinate system. The polynomial curve can be used to derive a heading, a kappa, and a dkappa for each point in the global coordinate system.

20 Claims, 10 Drawing Sheets

(51) Int. Cl.
*G01C 21/34* (2006.01)
*G06N 20/00* (2019.01)

(58) Field of Classification Search
CPC ............ G01C 21/3867; G01C 21/3446; G01C 21/3407; G06N 20/00; B60W 60/0013; B60W 60/001; B60W 30/14; B60W 40/105; B60W 50/14; B60W 2720/10; B60K 35/00; B60K 2370/175; B60K 2370/152; B60Y 2300/14
See application file for complete search history.

(56) References Cited

U.S. PATENT DOCUMENTS

| | | | |
|---|---|---|---|
| 2016/0375901 A1* | 12/2016 | Di Cairano | G01C 21/3453 |
| | | | 701/26 |
| 2018/0129203 A1 | 5/2018 | Tafti et al. | |
| 2019/0088148 A1* | 3/2019 | Jacobus | B60W 30/09 |
| 2019/0243371 A1* | 8/2019 | Nister | G05D 1/0231 |

FOREIGN PATENT DOCUMENTS

| | | | |
|---|---|---|---|
| JP | 2006126980 A | 5/2006 |
| JP | 2018047836 A | 3/2018 |
| WO | 2018089435 A2 | 5/2018 |
| WO | 2018179235 A1 | 10/2018 |

* cited by examiner

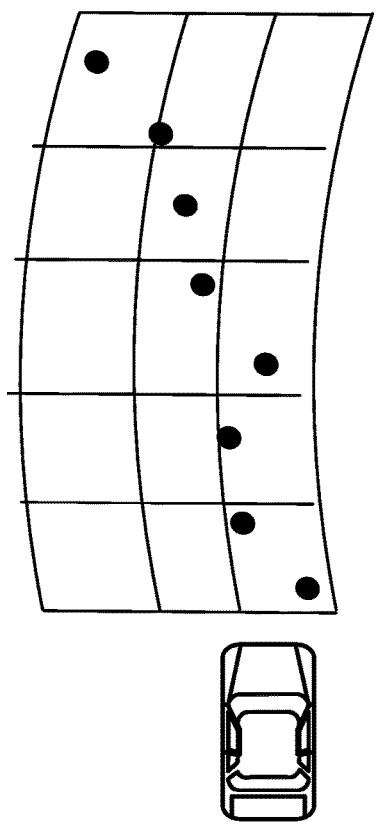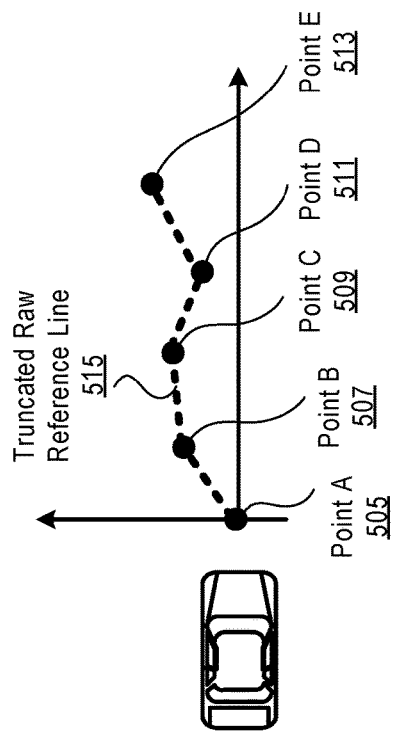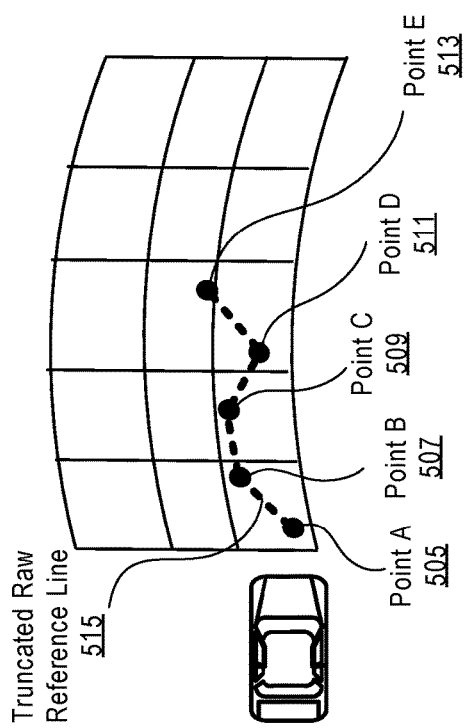

POLYNOMIAL-FIT BASED REFERENCE LINE SMOOTHING METHOD FOR HIGH SPEED PLANNING OF AUTONOMOUS DRIVING VEHICLES

CROSS-REFERENCE TO RELATED APPLICATION

This patent application is a U.S. National Phase Application under 35 U.S.C. § 371 of International Application No. PCT/CN2018/123936, filed Dec. 26, 2018, entitled "A POLYNOMIAL-FIT BASED REFERENCE LINE SMOOTHING METHOD FOR HIGH SPEED PLANNING OF AUTONOMOUS DRIVING VEHICLES," which is incorporated by reference herein by its entirety.

TECHNICAL FIELD

Embodiments of the present disclosure relate generally to operating autonomous vehicles. More particularly, embodiments of the disclosure relate to a reference line smoothing method in an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors and high-definition maps, allowing the vehicle to travel with minimal human interaction or in some cases without any passengers.

An autonomous driving vehicle (ADV) relies on various modules to plan trajectories. Typically, a reference line can be generated in a form of a topographic map for each planned trajectory, and can represent an ideal route or path without any interference from others such as other vehicles, obstacles, or traffic condition. The reference line can be smoothed using various techniques for comfortable driving.

However, when the ADV travels at a high speed, there would be a higher requirement for path point curvatures and their derivatives in order to maintain a particular centripetal acceleration. Existing smoothing techniques generally cannot meet the requirements in a high-speed environment.

SUMMARY

In an aspect of the disclosure, embodiments of the disclosure provide a computer-implemented method for operating an autonomous driving vehicle, the method including: transferring a reference line generated for an autonomous driving vehicle (ADV) from a global coordinate system to a local coordinate system, the reference line including a plurality of discrete points; determining, using a polynomial curve that best fits the plurality of points, a new vertical coordinate for a horizontal coordinate of each point on the reference line; transferring points represented by each new vertical coordinate and its corresponding horizontal coordinate back to the global coordinate system; and determining, using the polynomial curve, a heading direction, a kappa, and a dkappa for each transferred point.

In another aspect of the disclosure, embodiments of the disclosure provide a non-transitory machine-readable medium having instructions stored therein, which when executed by a processor, cause the processor to perform operations, the operations including: transferring a reference line generated for an autonomous driving vehicle (ADV), from a global coordinate system to a local coordinate system, the reference line including a plurality of discrete points; determining, using a polynomial curve that best matches the plurality of points, a new vertical coordinate for a horizontal coordinate of each point on the reference line; transferring points represented by each new vertical coordinate and its corresponding horizontal coordinate back to the global coordinate system; and determining, using the polynomial curve, a heading direction, a kappa, and a dkappa for each transferred point.

In another aspect of the disclosure, embodiments of the disclosure provide a data processing system, the system includes a processor; and a memory coupled to the processor to store instructions, which when executed by the processor, causing the processor to perform operations, the operations includes: transferring a reference line generated for an autonomous driving vehicle (ADV) from a global coordinate system to a local coordinate system, the reference line including a plurality of discrete points, determining, using a polynomial curve that best matches the plurality of points, a new vertical coordinate for a horizontal coordinate of each point on the reference line, transferring points represented by each new vertical coordinate and its corresponding horizontal coordinate back to the global coordinate system, and determining, using the polynomial curve, a heading direction, a kappa, and a dkappa for each transferred point.

BRIEF DESCRIPTION OF THE DRAWINGS

Embodiments of the disclosure are illustrated by way of example and not limitation in the figures of the accompanying drawings in which like references indicate similar elements.

FIGS. 6A-6E graphically illustrate a polynomial-fit based reference line smoothing method in accordance with an embodiment.

DETAILED DESCRIPTION

Figure 1:
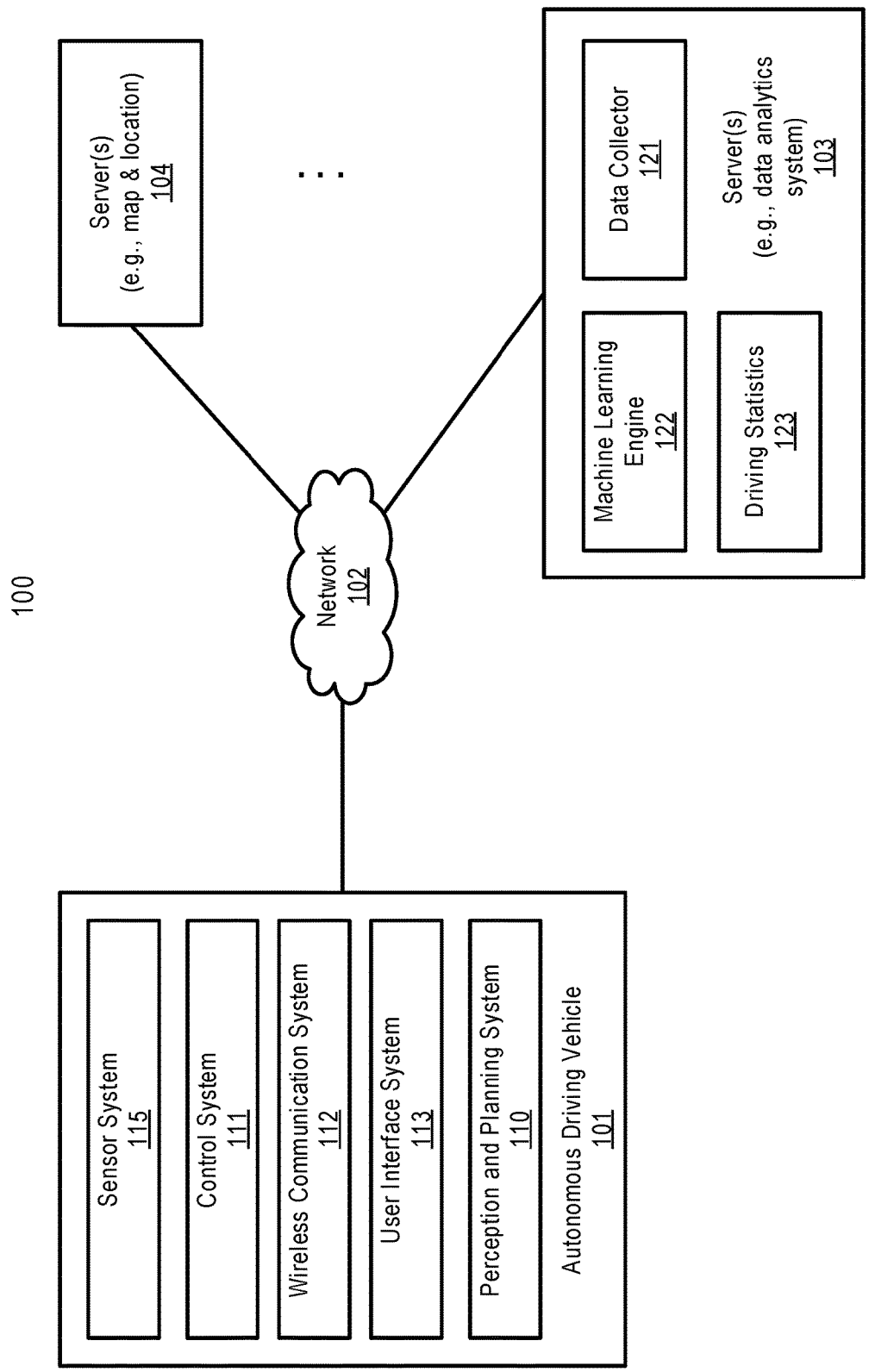
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, systems and methods for smoothing a reference line using a polynomial-fit curve are described. In an exemplary method, a raw reference line can be generated from a high definition map and routing results, and can be truncated based on a predetermined formula. The truncated raw reference line can include a number of points, each point representing a position of an autonomous driving vehicle in a global coordinate system. The number of points can be converted to points in a local coordinate system, where a polynomial curve that best fits the points are generated.

The polynomial curve can subsequently be used to generate a new vertical coordinate for a horizontal coordinate of each of the number of points. The new vertical coordinates and their corresponding horizontal coordinates can be converted back to the global coordinate system. The polynomial curve can be used to derive a heading, a kappa, and a dkappa for each point in the global coordinate system. The transferred points and the heading, the kappa and the dkappa for each point are used to create a new reference line for the ADV.

In an embodiment, the heading, the kappa, and the dkappa of each transferred points can be computed respectively using the first order derivative, the second order derivative, and the third derivative of the polynomial curve. Since the polynomial curve is a continuous, smooth, and unbroken line, its first order derivative, the second order derivative, and the third derivative are also smooth, thereby making the headings, the kappas, and the dkappas of the transferred points smooth and continuous.

Therefore, a reference line generated using the above-described approach would enable smoother and more comfortable driving. Embodiments described in this disclosure are particularly useful in an ADV that are designed to travel in a high-speed road conditions.

In an embodiment, the raw reference line can be generated for a planning phase that may include multiple driving/planning cycles. Each point on the raw reference line can represent a position of the ADV is to be at a particular point of time during the planning cycle.

In an embodiment, the polynomial curve can be in the format of $Y=C\_3*X^3+C\_2*X^2+C\_1*X^1+C\_0*X^0$. The above described reference line smoothing method can be used when the ADV travels at a speed exceeding a predetermined value. When the ADV travels at a speed at or below the predetermined value, the ADV can be automatically switched to another process implementing a different reference line smoothing method.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
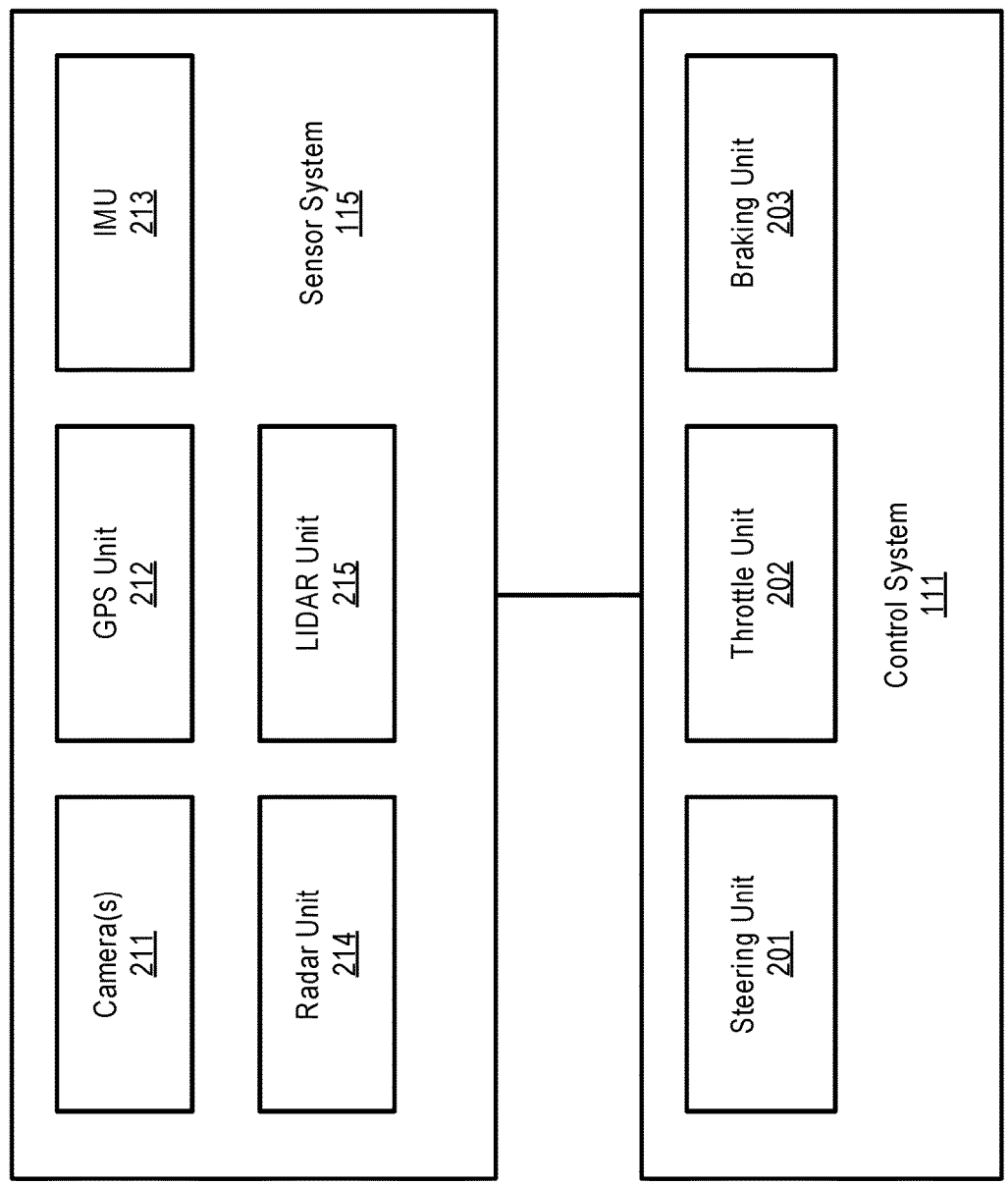
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes, including algorithms to generate reference lines using polynomial curve fitting techniques. Algorithms 124 can then be uploaded on ADVs to be utilized during autonomous driving in real-time.

Figure 3A:
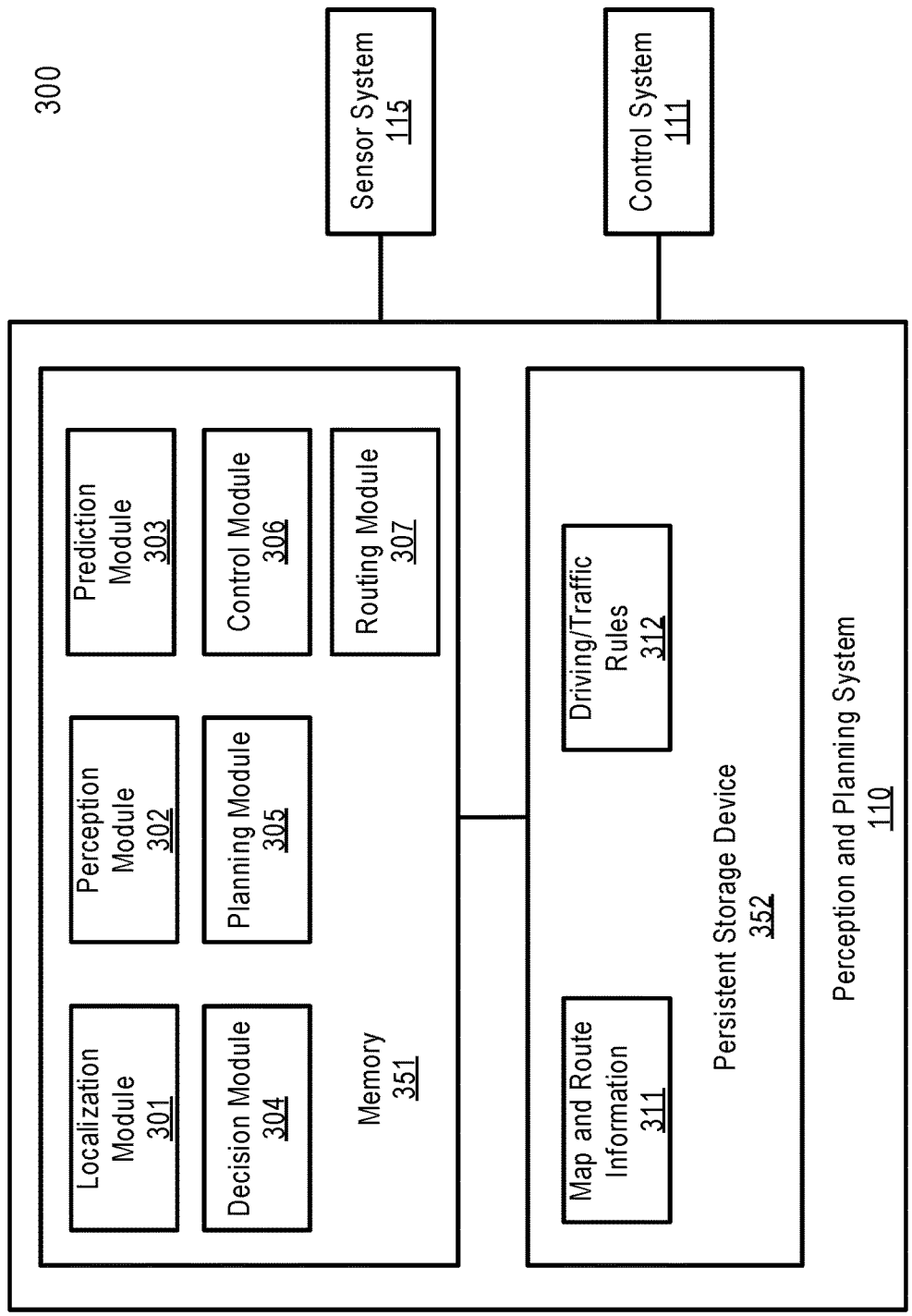
FIGS. 3A-3B are block diagrams illustrating an example of a perception and planning system used with an autonomous vehicle according to one embodiment.
Figure 3B:
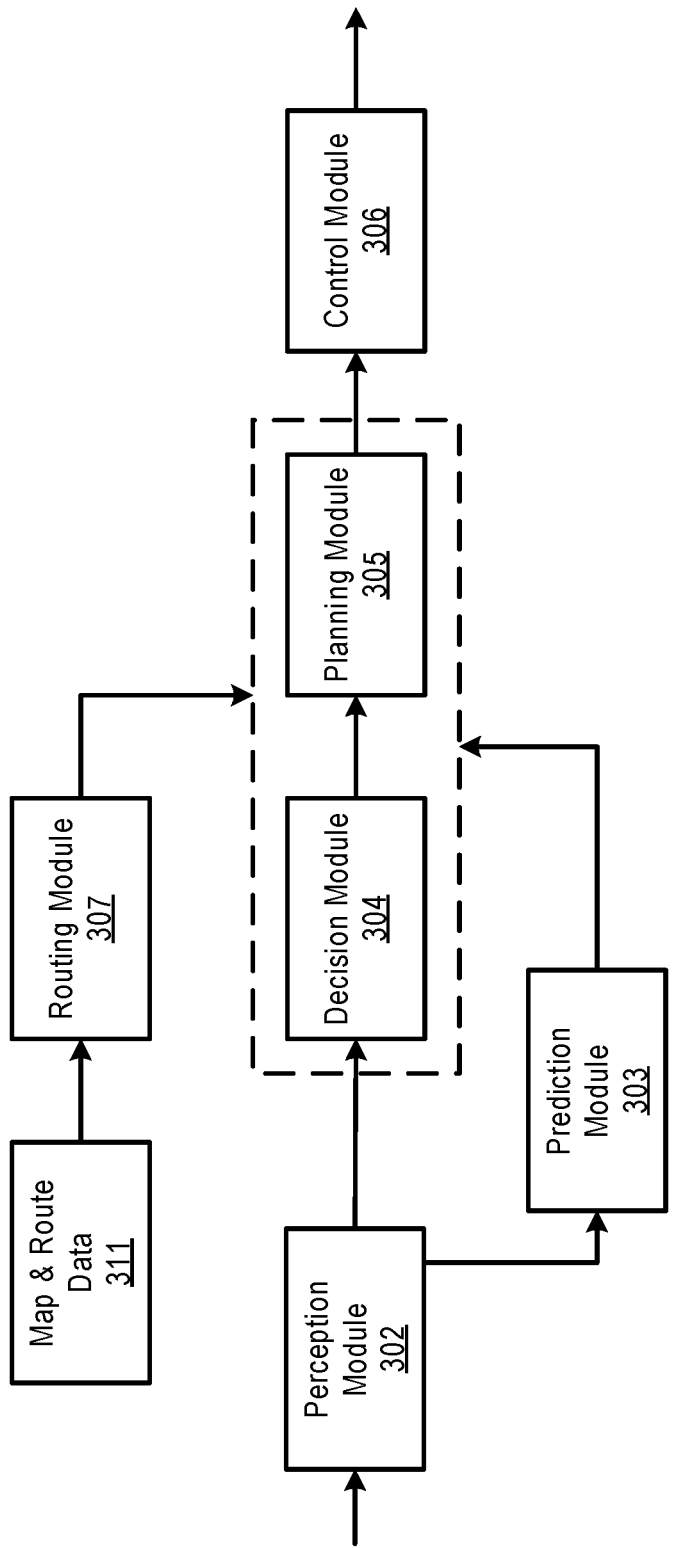

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this disclosure. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Polynomial-Fit Based Reference Line Smoothing

Figure 4:
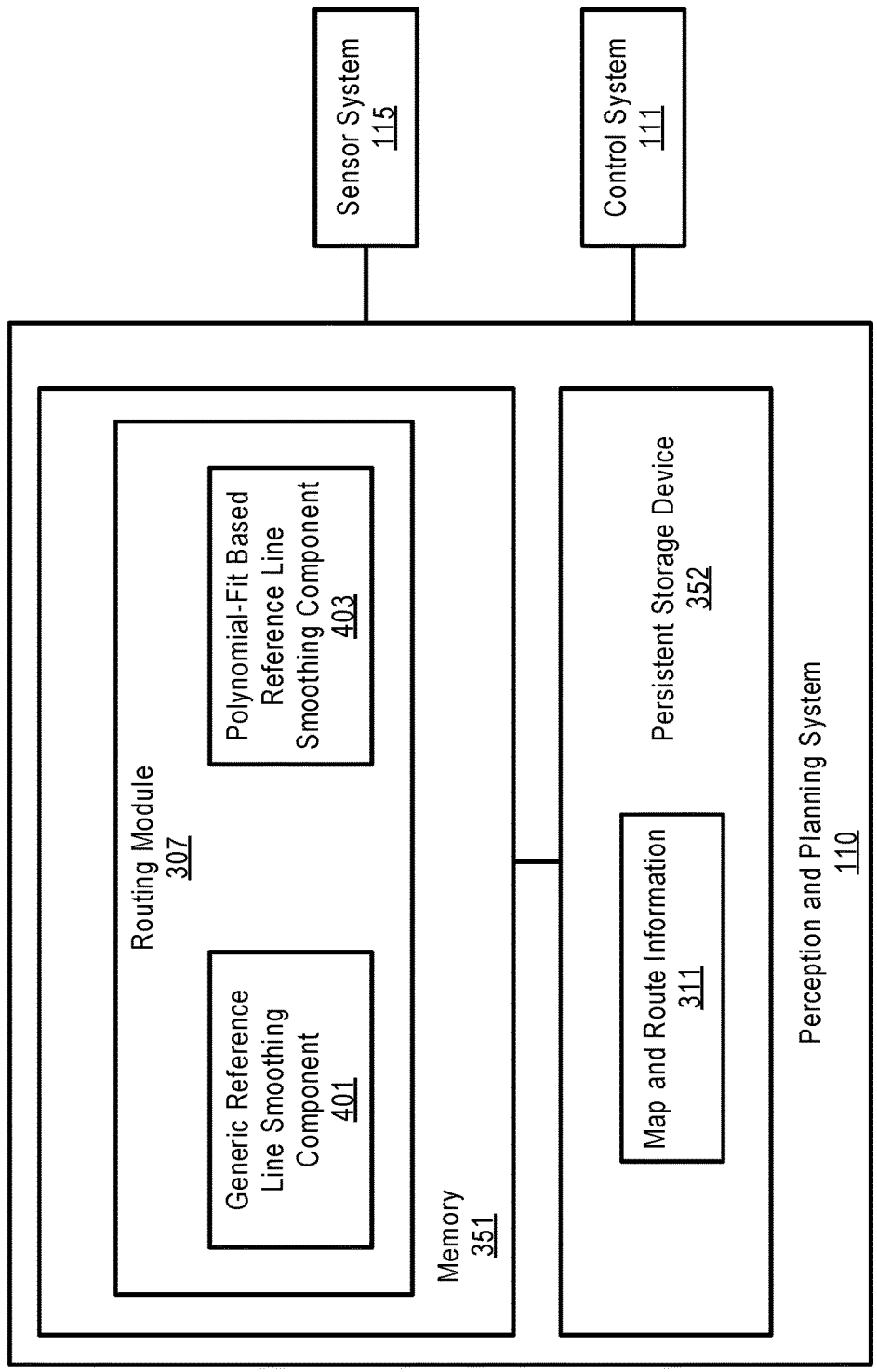
FIG. 4 illustrates an environment where a polynomial-fit based reference line smoothing component operates in an ADV in accordance with an embodiment.

FIG. 4 illustrates an environment where a polynomial-fit based reference line smoothing component operates in an ADV in accordance with an embodiment. As shown in FIG. 4, the routing module 307 in a perception and planning system 110 can include a generic reference line smoothing component 401 and a polynomial-fit based reference line smoothing component 403. Which reference line smoothing component to use can be based on a number of factors, including an expected speed of the ADV in a particular road segment.

For example, if the ADV gets on a high way with a speed limit of 70 miles per hour, the ADV can expect to travel at a higher speed on the high way than travelling in a local road segment with a speed limit of 35 miles per hour. As a result, the ADV can invoke the polynomial-fit based reference line smoothing component 403 to smooth a reference line generated for a road segment of the high way.

As used herein, in an embodiment, a reference line can be created in a form of a topographic map for each possible route determined by the routing module 307 from a starting point to a destination point.

When the ADV detects that it gets off the high way and starts to travel on a road segment with a speed limit that is lower than a predetermined value (e.g., 45 miles/hour), the ADV can switch back to the generic reference line smoothing component 401 for reference line smoothing. The polynomial-fit based reference line smoothing component 403 can implement a process for using a polynomial curve to generate a reference line that is smoother and more precise.

Figure 5:
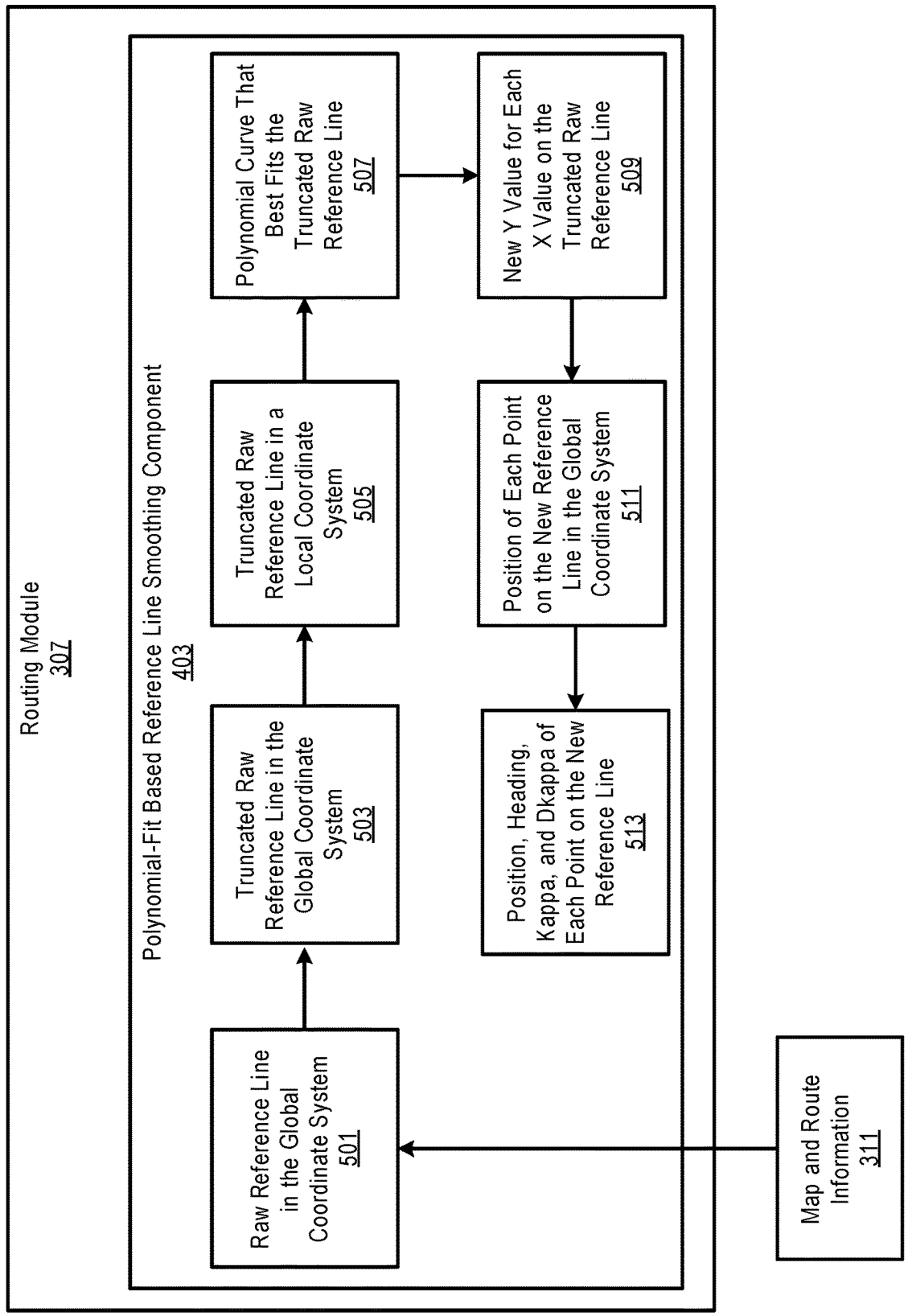
FIG. 5 further illustrates a polynomial-fit based reference line smoothing component in accordance with an embodiment.

FIG. 5 further illustrates a polynomial-fit based reference line smoothing component, in accordance with an embodiment. In one embodiment, a reference line smoothing process can be implemented by the polynomial-fit based reference line smoothing component 403. The smoothing process can include a number of operations configured to generate a reference line, and can provide a more comfortable driving experience in a high-speed environment.

As shown in FIG. 5, a raw reference line in a global coordinate system 501 can be generated by the routing module 307 when the ADV detects that it has entered a high-speed road segment. The raw reference line 501 can include a series of discrete points forming a line that connects a starting location to a destination location for a planning phase (e.g., 30 seconds). In an embodiment, a planning phase can be performed in a number of planning cycles in a time interval of 100 milliseconds (ms). The series of points can be generated based on routing results of the ADV and a high definition map. In one embodiment, the routing results can include various possible routes from the starting location to the destination location. Each point on the raw reference line represents a position of the ADV in the global coordinate system, and can therefore be referenced by a longitude value and a latitude value.

As further shown in FIG. 5, the raw reference 501 can be truncated to become a truncated raw reference line 503. The truncating can be based on a predetermined formula. In one example, the truncated raw reference line can have a length computed using the formula "current speed*12 seconds+30 meters". The number of 12 seconds and 30 meters are valued based on historical data, and can be changed to another set of numbers.

The truncated reference line 503 can be converted to a series of discrete points in a local coordinate system to create a truncated raw reference line 505 in the local coordinate system, where the x axis is the heading of the ADV at the beginning of the planning phase. In the local coordinate system, there would be a set of coordinates (e.g., a horizontal coordinate X, and a vertical coordinate Y) for each discrete point on the truncated reference line. A polynomial curve 507 that best fits the series of discrete points can be identified, and can be used to calculate a new vertical coordinate 509 for each horizontal coordinate. Each newly calculated vertical coordinate and its corresponding horizontal coordinate correspond to a point on a new smoothed reference line that is represented by the polynomial curve. Each point on the smoothed reference line can be converted back to a corresponding position 511 in the global coordinate system.

From the polynomial curve and the points transferred back from the local coordinate system, a number of parameters can be determined for each point, for use by the ADV in following the newly generated reference line, including a position, a heading, a kappa and a dkappa.

In an embodiment, the position of each point can be represented by a longitude value and a latitude value. The heading for each point can be derived from the fitted polynomial curve, for example, by using the formula y=atan $2(3*C_3*new_x*new\_x+2*C_2*new\_x+C_2, 1)$–target_heading+new_heading). In the above formulas, the "new_x" is the same as x, as the same x is provided to the best-fitting curve, which may generate a new y; "new_heading" is the heading of the first point in the in the original global coordinate system; and "target_heading" is the heading of the first point in the relative coordinate system, which can be 0 all the time.

In an embodiment, the kappa information can be derived from the fitted polynomial curve, for example, by using the formula $(2*C_2+6*C_3*new\_x)$. The dkappa information can be derived from the fitted polynomial curve, for example, by using the formula $(6*C_3)$.

In an embodiment, atan 2 (y, x) is a function that returns the arc tangent of the two numbers x and y. The result is an angle expressed in radians. In the above example, the first parameter $3*C_3*new_x*new\_x+2*C_2*new\_x+C_2$ of atan 2 is the first order derivative of the best-fitting curve. The formula used to calculate the kappa information of each point is the second order derivative of the best fitting curve. The formula used to calculate the dkappa information of each point is the third order derivative of the best fitting curve. In an embodiment, a kappa of a point can be the curvature, and the dkappa of that point can the rate of curvature (dkappa/dt).

Since the polynomial curve is smooth, its derivatives of different orders are also smooth. A smoothed reference line as such would provide a smoother and more comfortable driving experience in a high-speed environment, where higher requirements for curvatures are needed to maintain a particular acceleration. The magnitude of the centripetal acceleration can be expressed by $V^2/R$. In the above expression, V is the speed of the ADV, and R is the radius of the curvature at a particular point.

Figure 6D:
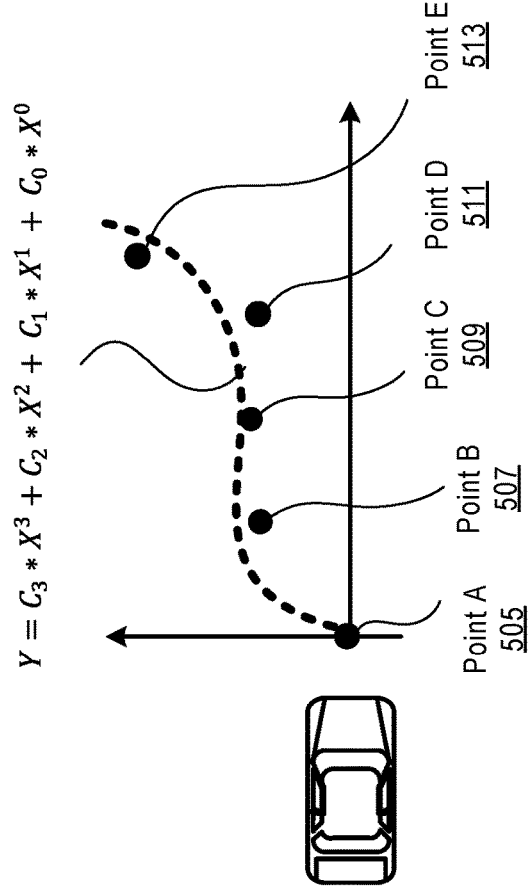
Figure 6E:
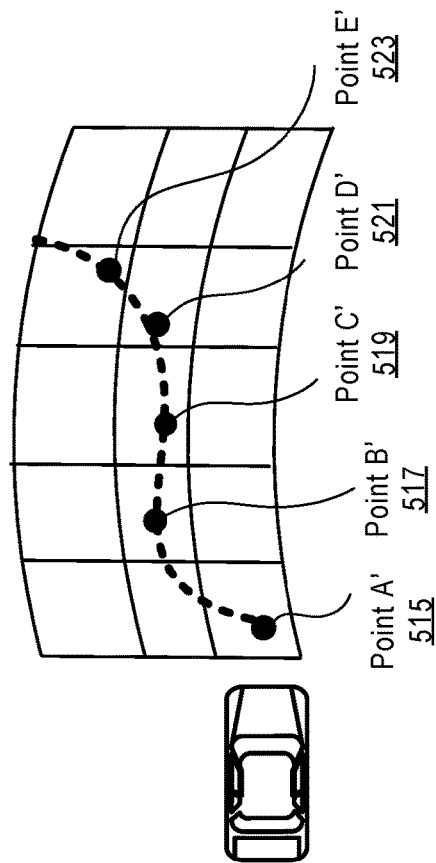

FIGS. 6A-6E graphically illustrates a polynomial-fit based reference line smoothing method in accordance with an embodiment. In FIG. 6A, a raw reference line is generated by a routing module in an ADV. The raw reference line includes a series of discrete points in a global coordinate system, wherein the discrete points forms a line that connects a starting location to a destination location during a planning phase. In FIG. 6B, the raw reference line is truncated based on a predetermined formula to create a truncated raw reference line 515, which can include a series of discrete points 505-513. Each point can be referenced by a longitude value and a latitude value. In FIG. 6C, the series of discrete points 505-513 can be converted to a local coordinate system, where the x axis can be the heading of the ADV at the beginning of the planning phase or at the moment of the coordinate system change. FIG. 6D illustrates a polynomial curve that best fits the series of discrete points 505-513 in the local coordinate system. As shown in FIG. 6D, the best-fitting polynomial curve can be in the format of $=C_3*X^3+C_2*X^2+C_1*X^1+C_0*X^0$. FIG. 6E shows a series of new points 515-523 in the global coordinate system. Each of the series of new points 515-523 can correspond to a point on the best-fitting polynomial curve in the local coordinate system. Using the best-fitting polynomial curve, the routing module can calculate a heading direction, a kappa, and dkappa for each of the discrete points on the best-fitting curve. The series of discrete points with the calculated information would represent a smooth reference line in a high-speed environment.

Figure 7:
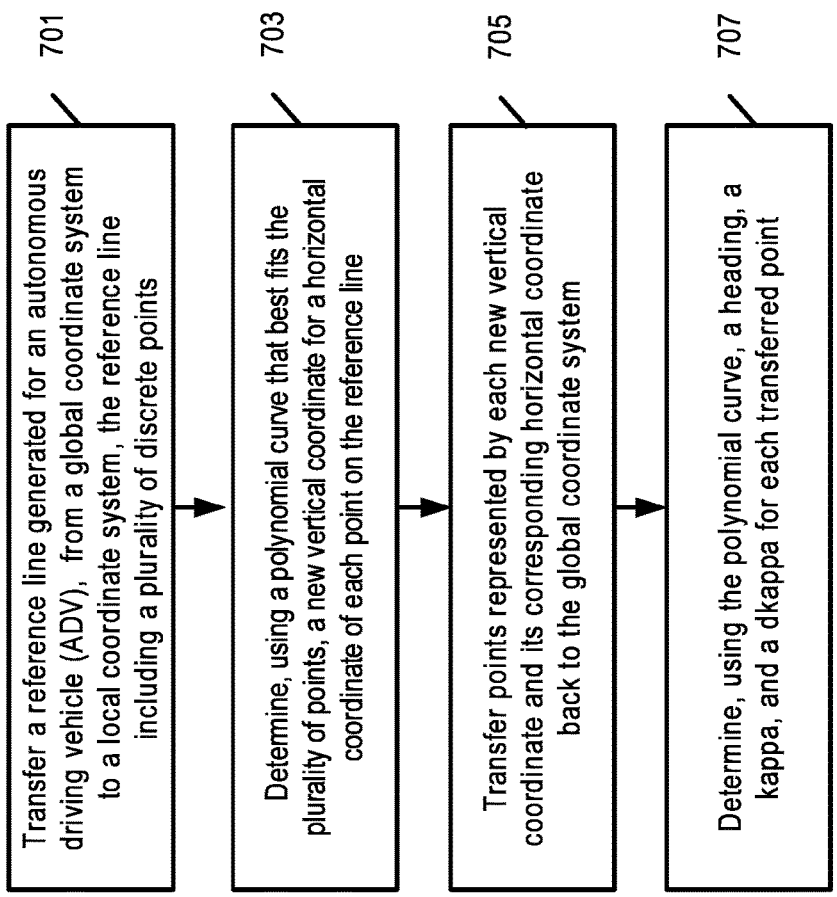
FIG. 7 is a flow diagram illustrating an example process of smoothing a reference line in accordance with an embodiment.

FIG. 7 is a flow diagram illustrating an example process of smoothing a reference line in accordance with an embodiment. Process 700 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 700 may be performed by one or more of perception module 302, planning module 305, and routing module 307 illustrated in FIG. 3A and FIG. 3B.

Referring to FIG. 7, in operation 701, a reference line generated for an autonomous driving vehicle is transferred from a global coordinate system to a local coordinate system. The reference line can be part of a raw reference line generated by a routing module of an ADV during a planning phase based on a high definition map and planning information. The raw reference line can include a series of discrete points, with each point representing an expected position at a point of time in the planning phase and referenced by a longitude value and a latitude value. By transferring the reference line from the global coordinate system to the local coordinate system, the routing module of the ADV converts the position values of each discrete point from a global coordinate format (e.g., a longitude value and a latitude value) to a local coordinate format (e.g., a vertical coordinate and a horizontal coordinate). When performing the conversion, the routing module uses the heading of the ADV as the x axis.

In operation 703, a polynomial curve that best fits or matches the discrete points on the truncated reference line can be used to determine a new vertical coordinate in the local coordinate system for the horizontal coordinate of each of the series of points on the truncated reference line. In an embodiment, regression and cross-validation techniques can be used to find the best-fitting curve, which can be a third-degree polynomial function.

In operation 705, a series of points represented by new vertical coordinates and the corresponding horizontal coordinates can be converted back to the global coordinate system.

In operation 707, a heading, a kappa, and dkappa are determined for each of the transferred points using the best-fitting polynomial curve. The series of points converted back to the global coordinate system and the above-determined information for each point can provide sufficient information for an ADV to provide a smoother and more comfortable driving experience in a high-speed environment that has a higher curvature requirements.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this disclosure. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
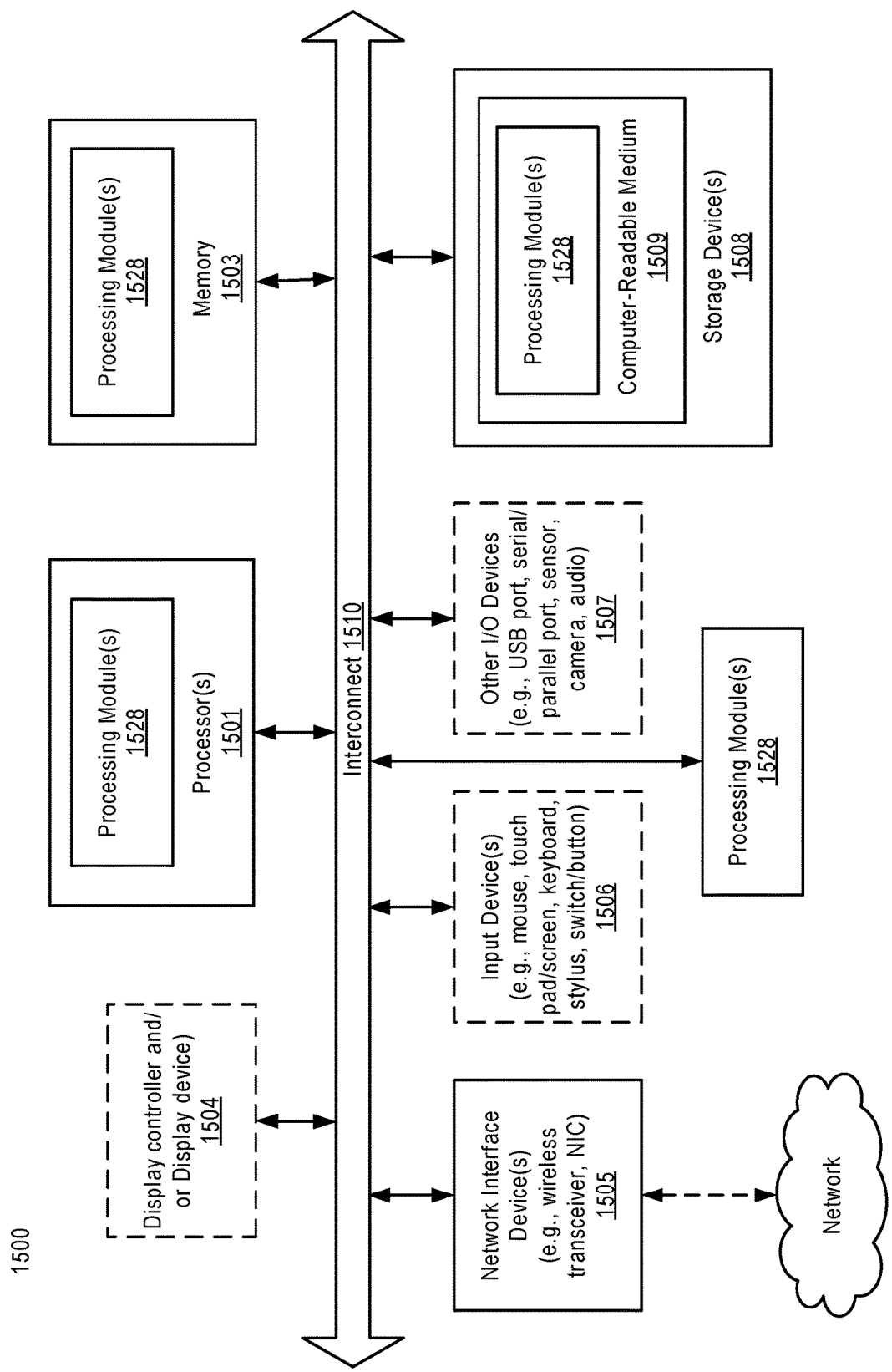
FIG. 8 is a block diagram illustrating an example of a data processing system which may be used with one embodiment.

FIG. 8 a block diagram illustrating an example of a data processing system which may be used with one embodiment of the disclosure. For example, system 1500 may represent any of data processing systems described above performing any of the processes or methods described above, such as, for example, the routing module 307 of FIG. 3A. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, and control module 306, and routing module 307. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
 transferring a reference line generated for the ADV from a global coordinate system to a local coordinate system, the reference line including a plurality of discrete points;
 determining, using a polynomial curve that best fits the plurality of discrete points, a new vertical coordinate for a horizontal coordinate of each point on the reference line;
 transferring points represented by each new vertical coordinate and its corresponding horizontal coordinate back to the global coordinate system;
 determining, using the polynomial curve, a heading direction, a kappa, and a dkappa for each transferred point; and
 controlling the ADV to navigate based on the reference line having the transferred points in the global coordinate system.

2. The method of claim 1, wherein the transferred points and the heading direction, the kappa and the dkappa for each point are used to create a new reference line for the ADV.

3. The method of claim 1, wherein the reference line is part of a raw reference line generated for a planning phase, wherein the reference line is created by truncating the raw reference line based on a set of predetermined criteria.

4. The method of claim 3, wherein each point on the reference line represents a position that the ADV is to be at a particular point of time in the planning phase.

5. The method of claim 1, wherein the polynomial curve is in a format of $Y=C_3*X^3+C_2*X^2+C_1*X^1+C_0*X^0$.

6. The method of claim 1, wherein the ADV travels at a speed exceeding a predetermined value.

7. The method of claim 6, wherein the ADV is to switch to another process implementing a different reference line smoothing method when the ADV travels at a speed at or below the predetermined value.

8. A non-transitory machine-readable medium having instructions stored therein, which when executed by a processor, cause the processor to perform operations, the operations comprising:
  transferring a reference line generated for an autonomous driving vehicle (ADV), from a global coordinate system to a local coordinate system, the reference line including a plurality of discrete points;
  determining, using a polynomial curve that best matches the plurality of discrete points, a new vertical coordinate for a horizontal coordinate of each point on the reference line;
  transferring points represented by each new vertical coordinate and its corresponding horizontal coordinate back to the global coordinate system;
  determining, using the polynomial curve, a heading direction, a kappa, and a dkappa for each transferred point; and
  controlling the ADV to navigate based on the reference line having the transferred points in the global coordinate system.

9. The machine-readable medium of claim 8, wherein the transferred points and the heading direction, the kappa and the dkappa for each point are used to create a new reference line for the ADV.

10. The machine-readable medium of claim 8, wherein the reference line is part of a raw reference line generated for a planning phase, wherein the reference line is created by truncating the raw reference line based on a set of predetermined criteria.

11. The machine-readable medium of claim 10, wherein each point on the reference line represents a position that the ADV is to be at a particular point of time in the planning phase.

12. The machine-readable medium of claim 8, wherein the polynomial curve is in a format of $Y=C_3*X^3+C_2*X^2+C_1*X^1+C_0*X^0$.

13. The machine-readable medium of claim 8, wherein the ADV travels at a speed exceeding a predetermined value.

14. The non-transitory machine-readable medium of claim 13, wherein the ADV is to switch to another process implementing a different reference line smoothing method when the ADV travels at a speed at or below the predetermined value.

15. A data processing system, comprising:
  a processor; and
  a memory coupled to the processor to store instructions, which when executed by the processor, causing the processor to perform operations, the operations comprising:
    transferring a reference line generated for an autonomous driving vehicle (ADV) from a global coordinate system to a local coordinate system, the reference line including a plurality of discrete points,
    determining, using a polynomial curve that best matches the plurality of discrete points, a new vertical coordinate for a horizontal coordinate of each point on the reference line,
    transferring points represented by each new vertical coordinate and its corresponding horizontal coordinate back to the global coordinate system,
    determining, using the polynomial curve, a heading direction, a kappa, and a dkappa for each transferred point; and
    controlling the ADV to navigate based on the reference line having the transferred points in the global coordinate system.

16. The system of claim 15, wherein the transferred points and the heading direction, the kappa and the dkappa for each point are used to create a new reference line for the ADV.

17. The system of claim 15, wherein the reference line is part of a raw reference line generated for a planning phase, wherein the reference line is created by truncating the raw reference line based on a set of predetermined criteria.

18. The system of claim 17, wherein each point on the reference line represents a position that the ADV is to be at a particular point of time in the planning phase.

19. The system of claim 15, wherein the polynomial curve is in a format of $Y=C_3*X^3+C_2*X^2+C_1*X^1+C_0*X^0$.

20. The system of claim 15, wherein the ADV travels at a speed exceeding a predetermined value, and wherein the ADV is to switch to another process implementing a different reference line smoothing method when the ADV travels at a speed at or below the predetermined value.

* * * * *